US011557933B2

(12) United States Patent
Neet et al.

(10) Patent No.: US 11,557,933 B2
(45) Date of Patent: Jan. 17, 2023

(54) ELECTRIC MACHINE WITH DISTRIBUTED WINDING HAVING DOUBLE CROSS END LOOPS

(71) Applicant: BorgWarner Inc., Auburn Hills, MI (US)

(72) Inventors: Kirk Neet, Noblesville, IN (US); Tausif Husain, Carmel, IN (US)

(73) Assignee: BorgWarner Inc., Auburn Hills, MI (US)

( * ) Notice: Subject to any disclaimer, the term of this patent is extended or adjusted under 35 U.S.C. 154(b) by 100 days.

(21) Appl. No.: 17/139,591

(22) Filed: Dec. 31, 2020

(65) Prior Publication Data

US 2021/0126501 A1 Apr. 29, 2021

Related U.S. Application Data

(62) Division of application No. 16/258,270, filed on Jan. 25, 2019, now Pat. No. 10,998,788.

(51) Int. Cl.
*H02K 3/28* (2006.01)
*H02K 1/16* (2006.01)
*H02K 3/12* (2006.01)
*B60K 6/26* (2007.10)
*B60K 6/442* (2007.10)

(52) U.S. Cl.
CPC ............. *H02K 3/28* (2013.01); *H02K 1/16* (2013.01); *H02K 3/12* (2013.01); *B60K 6/26* (2013.01); *B60K 6/442* (2013.01); *B60K 2006/268* (2013.01); *Y10S 903/906* (2013.01)

(58) Field of Classification Search
CPC .. H02K 3/28; H02K 3/12; H02K 3/14; H02K 3/50; H02K 1/16; H02K 15/065; B60K 6/26; B60K 6/442; B60K 2006/268; Y10S 903/906
USPC .................................................. 310/207, 208
See application file for complete search history.

(56) References Cited

U.S. PATENT DOCUMENTS

| 7,348,705 | B2 | 3/2008 | Cai et al. |
| 8,716,910 | B2 | 5/2014 | Edrington |
| 9,467,010 | B2 | 10/2016 | Stephenson et al. |
| 9,866,083 | B2 * | 1/2018 | Tamura ............... H02K 3/28 |
| 9,979,242 | B2 | 5/2018 | Neet et al. |
| 10,110,078 | B2 | 10/2018 | Neet |
| 2005/0206263 | A1 * | 9/2005 | Cai ..................... H02K 3/12 310/201 |

(Continued)

FOREIGN PATENT DOCUMENTS

JP 2015084635 A 4/2015

*Primary Examiner* — Michael Andrews
(74) *Attorney, Agent, or Firm* — Maginot, Moore & Beck, LLP

(57) ABSTRACT

An electric machine a stator having a stator core and windings positioned thereon. The stator core has a plurality of slots formed therein and a winding positioned in the plurality of slots. The winding includes at least four parallel paths distributed in slot sets of the stator core. Each slot set includes at least four contiguous slots including two left slots and two right slots. A first parallel path and a second parallel path are arranged in the two left slots for at least a first revolution of the winding around the core. The first parallel path and the second parallel path are arranged in the two right slots for at least a subsequent revolution of the winding around the core.

17 Claims, 10 Drawing Sheets

(56) References Cited

U.S. PATENT DOCUMENTS

| | | | | |
|---|---|---|---|---|
| 2005/0258703 | A1* | 11/2005 | Kouda | H02K 3/28 |
| | | | | 310/180 |
| 2011/0001373 | A1 | 1/2011 | Mori et al. | |
| 2015/0054374 | A1 | 2/2015 | Neet | |
| 2015/0076953 | A1* | 3/2015 | Tamura | H02K 3/28 |
| | | | | 310/208 |
| 2019/0020237 | A1* | 1/2019 | Neet | H02K 3/12 |

* cited by examiner

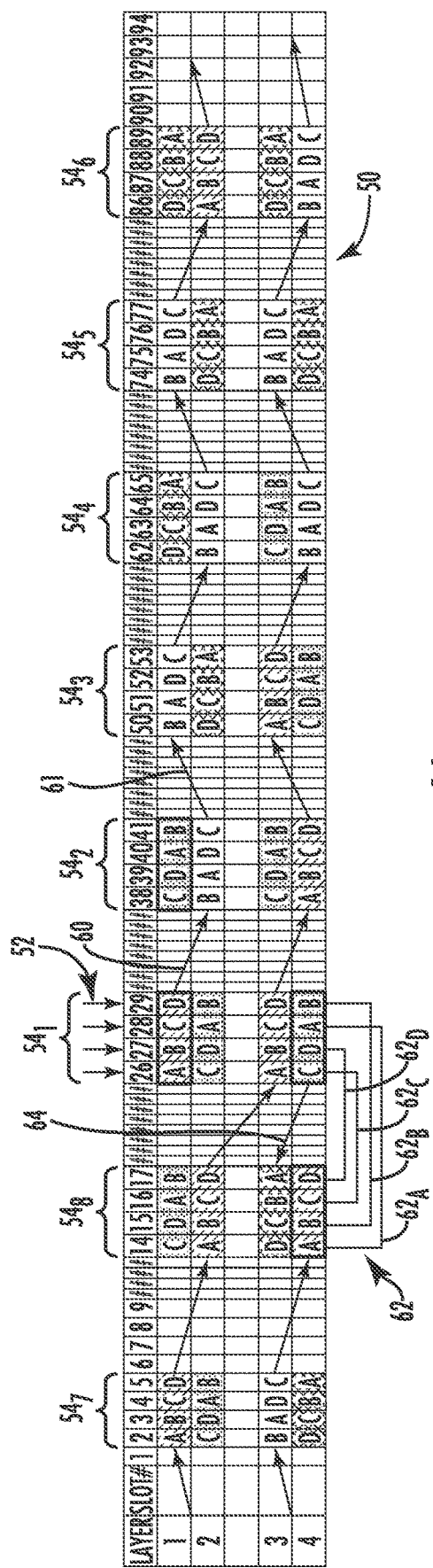
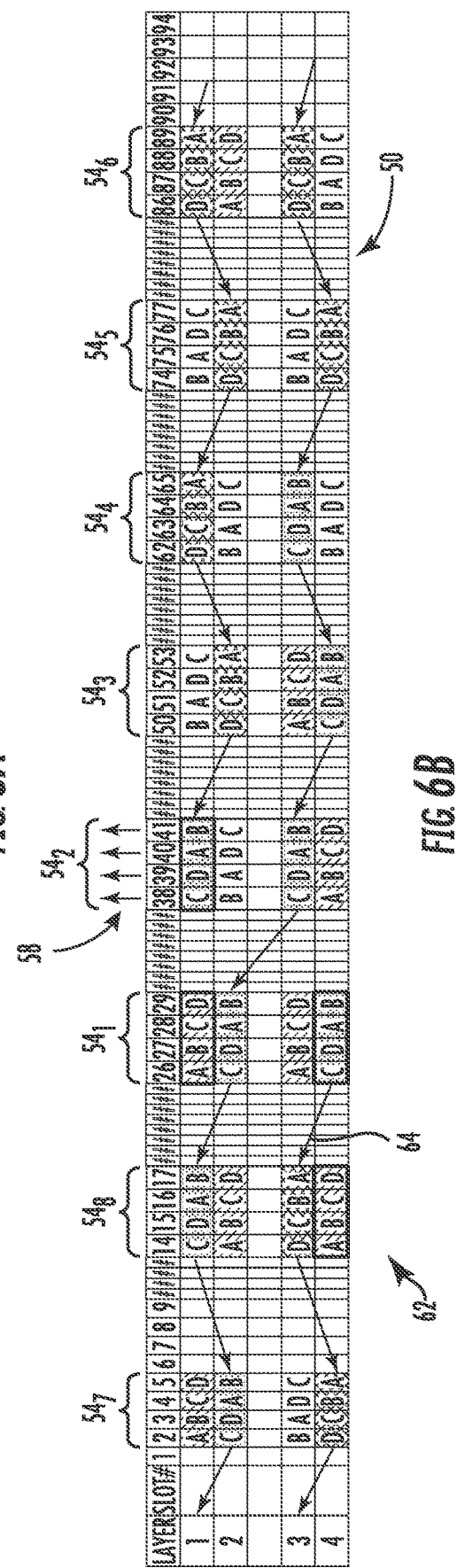
FIG. 6A
FIG. 6B

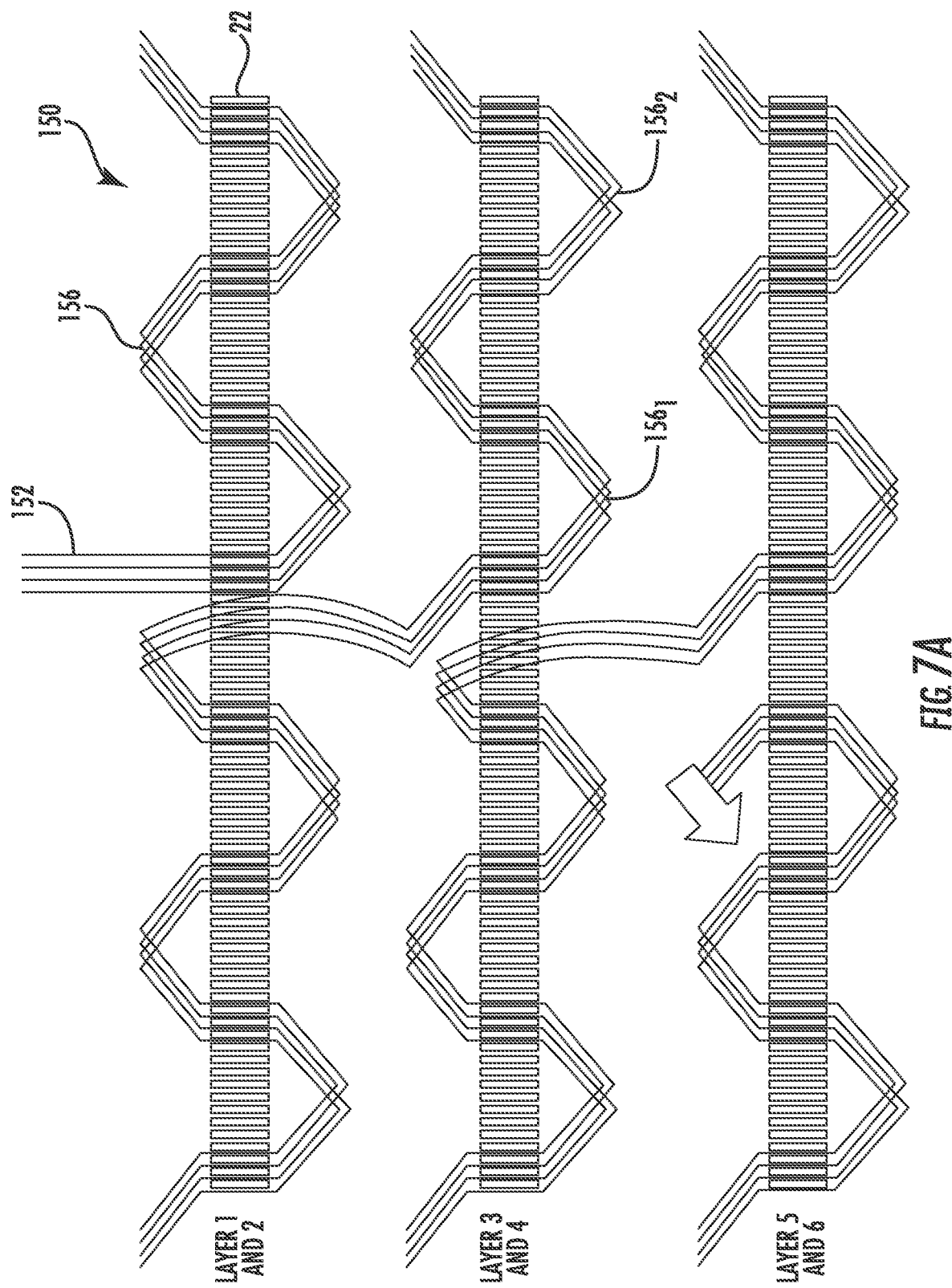

ELECTRIC MACHINE WITH DISTRIBUTED WINDING HAVING DOUBLE CROSS END LOOPS

CROSS-REFERENCE TO RELATED APPLICATIONS

This application claims is a divisional of U.S. patent application Ser. No. 16/258,270, filed Jan. 25, 2019, the entire contents of which are incorporated herein by reference.

FIELD

This application relates to the field of electric machines, and more particularly, winding arrangements for electric machines.

BACKGROUND

Electric machines are designed to meet specific operating requirements depending on the intended application the electric machine. Depending on the specific design of the electric machine, the machine will have any of various performance characteristics. Examples of design features that contribute to operating performance include stator size, rotor size, torque output, efficiency, type and arrangement of the of windings, number of stator slots, number of poles, slots per pole per phase, number of conductors per slot, number of parallel paths per phase, number of turns, and any of various other design parameters as will be recognized by those of ordinary skill in the art.

It would be desirable to provide an electric machine with a distributed winding arrangement having improved power, efficiency and cooling ability. It would also be advantageous for such a winding arrangement to provide an improved sinusoidal waveform for a stator that reduces harmonic emf and reduces torque ripple in the machine. It would be advantageous if such a winding arrangement could be utilized in various power applications, including various electric and/or hybrid-electric vehicle applications. It would be of further advantage if such winding arrangement could be provided such that the electric machine may be easily manufactured, thus reducing manufacturing costs. While it would be desirable to provide an electric machine that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

In accordance with at least one embodiment of the disclosure, an electric machine comprises a stator having a stator core and a winding. The stator includes a plurality of slots formed therein. The winding is positioned in the plurality of slots of the stator core. The winding includes at least four parallel paths distributed in slot sets of the stator core. Each slot set includes at least four contiguous slots including two left slots and two right slots. A first parallel path and a second parallel path are arranged in the two left slots for at least a first revolution around the core. The first parallel path and the second parallel path are arranged in the two right slots for at least a subsequent revolution around the core.

In at least one embodiment of the disclosure, a stator for an electric machine comprises a stator core and at least one stator winding. The stator core includes a plurality of slots, and the stator winding is positioned in the plurality of slots. The at least one stator winding includes at least four parallel paths for each phase, each parallel path including in-slot conductors connected by end loops, each of the end loops defined by an end loop pitch, and each parallel path including at least four different end loop pitches.

In at least one additional embodiment of the disclosure a stator for an electric machine includes a stator core having a plurality of slots formed therein and a winding positioned in the plurality of slots. One phase of the winding includes at least four parallel paths distributed in slot sets of the stator core, with each slot set comprising at least four contiguous slots including two left slots and two right slots. Each parallel path makes at least four revolutions around the stator core, the four revolutions including clockwise first and second revolutions and counter-clockwise third and fourth revolutions. A first parallel path and a second parallel path switch position in the two left slots of the slot sets for the clockwise first and second revolutions, and a third parallel path and a fourth parallel path switch position in the two right slots of the slot sets for the clockwise first and second revolutions. After the end of the clockwise first and second clockwise revolutions, the first and second parallel paths switch positions with the third and fourth parallel paths. Consequently, for the third and fourth counter-clockwise revolutions, the first and second parallel paths will be located in the two right slots and the third and fourth parallel paths will be located in the two left slots of the slot sets. The first and second parallel paths switch position in the two right slots of the slot sets for the counter-clockwise third and the fourth revolutions, and the third and fourth parallel paths switch position in the two left slots of the slot sets for the counter-clockwise third and fourth revolutions. The other two phases in the stator winding are similar except shifted a certain number of slots in the stator core slots.

The above described features and advantages, as well as others, will become more readily apparent to those of ordinary skill in the art by reference to the following detailed description and accompanying drawings. While it would be desirable to provide an electric machine with a stator winding arrangement that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 6A shows a slot graph including the position of each parallel path A-D and associated end loop connections that form two clockwise revolutions of the stator winding of FIGS. 5A-5D;

FIG. 6B shows the slot graph of FIG. 6A including the end loop connections that form two counter-clockwise revolutions of the stator winding; and FIGS. 7A and 7B show a linear projection view of an alternative embodiment of the stator winding of FIGS. 5A-5D, the alternative embodiment of the stator winding including four parallel paths of one phase arranged in layers 1-6 for six revolutions of the stator core;

DESCRIPTION

Figure 1:
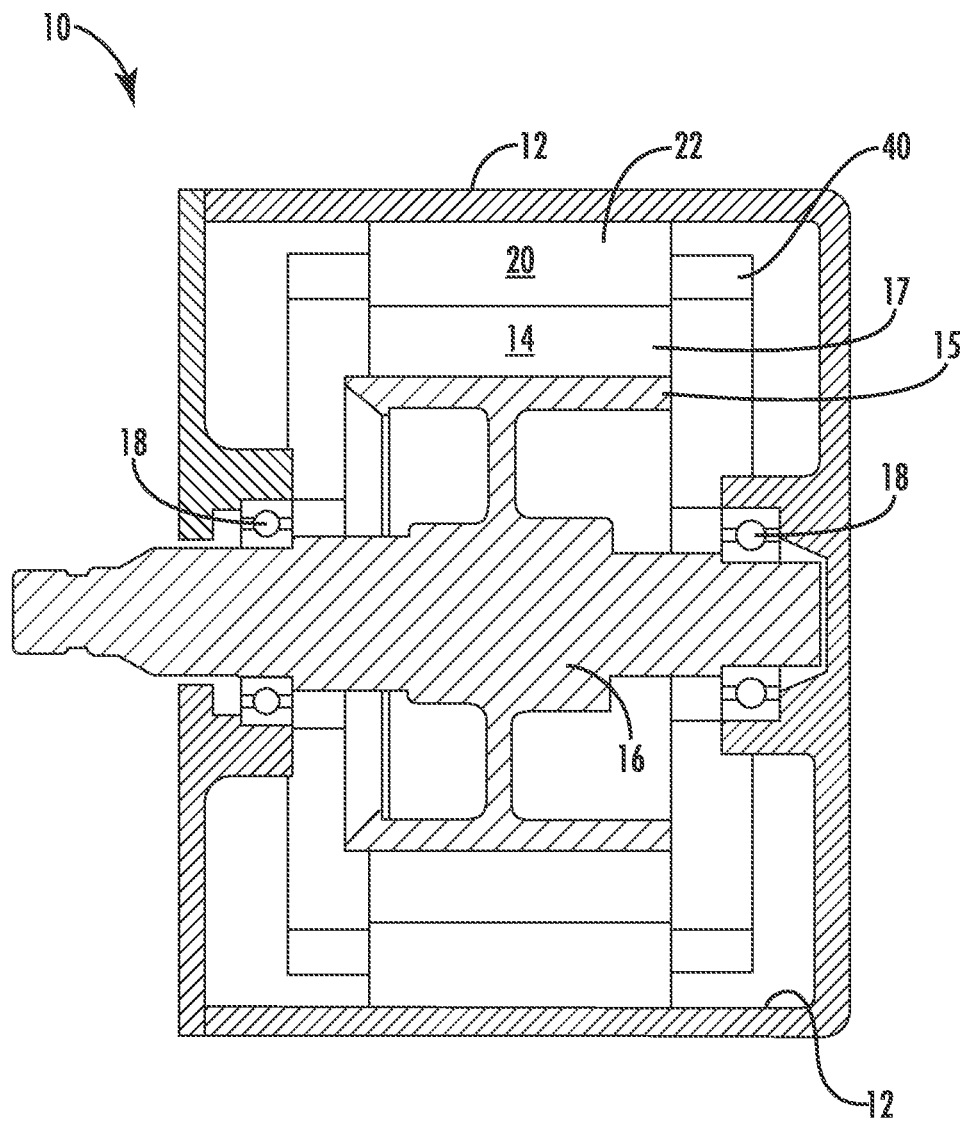
FIG. 1 shows a cross-sectional view of an electric machine including a stator with a distributed winding having double-crossed end loops.

With reference to FIGS. 1-3B, an electric machine 10 includes a housing 12 with a stator assembly 20 and a rotor assembly 14 positioned within the housing 12. The stator assembly 20 includes a stator core 22 with a winding arrangement 40 positioned on the stator core 22. As disclosed herein, the winding arrangement is a distributed winding arrangement that includes multiple parallel paths per phase and multiple end cross loops of different pitches extending between different sets of wires or other conductors positioned in the slots.

The rotor assembly 14 is positioned inside of the stator core 22 and is mounted on a shaft 16. The shaft 16 is rotatably supported by bearings 18. The shaft 16, in turn, supports the rotor assembly 14. The rotor assembly 14 includes a rotor hub 15 that is fixed relative to the shaft 16, and a rotor lamination 17 that is fixedly secured to the rotor hub 15 and configured to rotate relative to stator 20. In at least one embodiment, permanent magnets (not shown) are mounted on the rotor lamination 17. In at least one alternative embodiment, electrical windings (not shown) are included on the rotor lamination 17. The rotor 14 and shaft 16 are configured to rotate within the electrical machine 10 while the stator assembly 20 remains stationary.

The stator assembly 20 includes both the stator core 22 and the winding arrangement 40. The stator core 22 is comprised of a ferromagnetic material and is typically formed from a plurality of steel sheets that are stamped and stacked upon one another to form a lamination stack. The stator core 22 is generally cylindrical in shape as defined by a center axis 24, and includes an inner perimeter surface 26 and an outer perimeter surface 28. A plurality of teeth 31 are formed on the interior of the stator core 22 between the inner perimeter surface 26 and the outer perimeter surface 28. Each tooth extends radially inward and terminates at the inner perimeter surface 26. Axial slots 30 are formed in the stator core 22 between the teeth 31.

Figure 2:
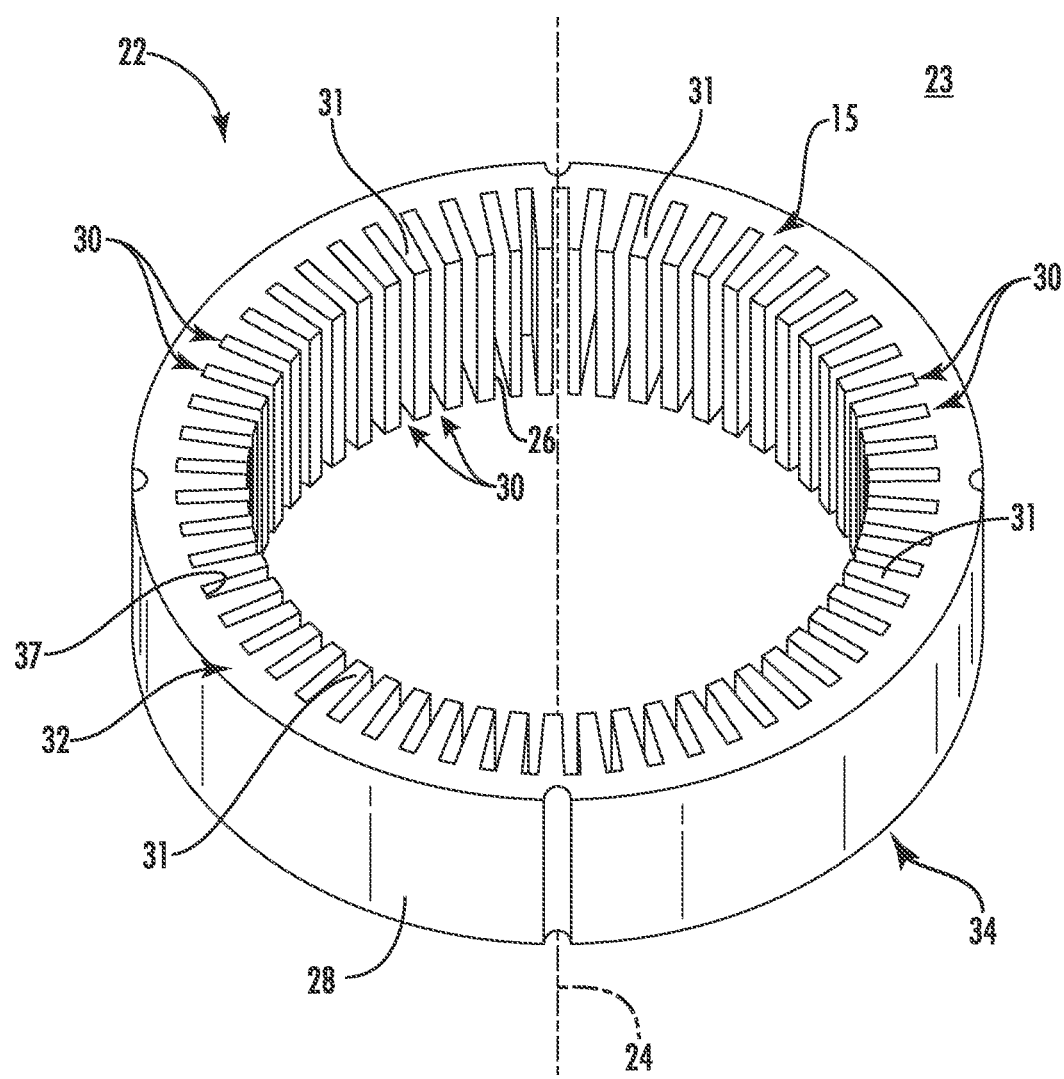
FIG. 2 shows a perspective view of a stator core of the electric machine of FIG. 1.

Depending on the configuration of the teeth 31, the slots 30 may be open along the inner perimeter surface 26 of the stator core 16, as shown in FIG. 2, or may be semi-closed slots with each slot 28 having a smaller width near the inner perimeter surface 26 than the width closer to the outer perimeter surface 28. Openings to the slots 30 are provided through the inner perimeter surface 26 as well as the ends 32 and 34 of the stator core 22. As described in further detail below, each slot is defined by opposing radial walls and wires or other conductors are retained within the slots.

The stator core 22 is configured to retain the winding arrangement 40 within the slots 30 of the stator core 22. In at least one embodiment, the winding arrangement 40 is formed from a plurality of elongated wires (e.g., copper wires) that are continuously wound within the slots 30 on the stator core 22 in order to form the windings. In at least one alternative embodiment, the winding arrangement 40 is formed from a plurality of segmented conductors 42. The segmented conductors 42 are inserted into the slots 30 from a first end 32 (i.e., the "insertion end") of the stator core 34. The segmented conductors 42 are connected together at an opposite end 22 of the stator core 16 (i.e., the "weld end"). An example of segmented conductors 42 that may be used to form the winding arrangement is shown in U.S. Pat. No. 7,622,843, the contents of which are incorporated herein by reference.

Figure 3A:
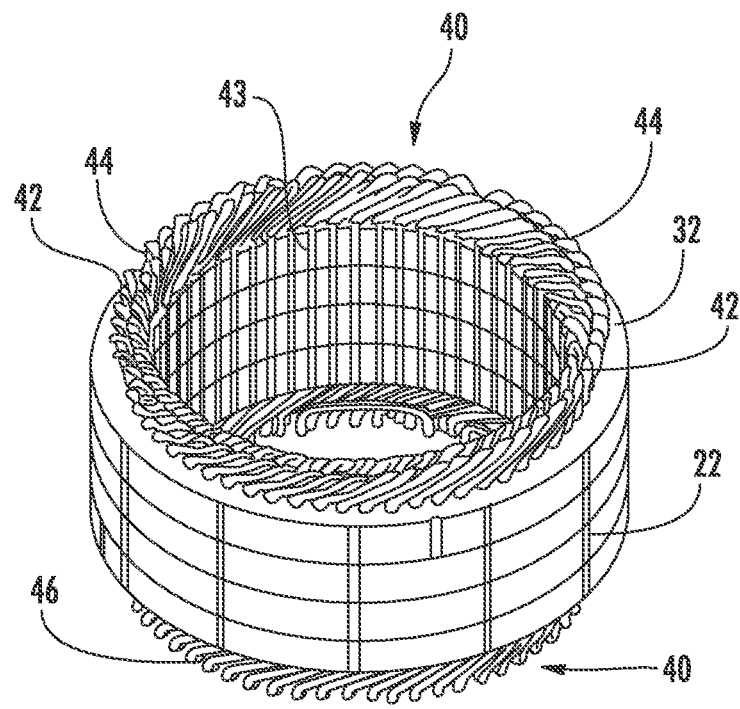
FIG. 3A shows a perspective end-turn view of the stator core of FIG. 2 with a winding arranged on the stator core.

FIG. 3A shows the insertion end 32 of the stator 20 with a plurality of segmented conductors 42 positioned in the slots of the stator core 22. Each of the segmented conductors 42 includes a first axial portion 43 positioned in one slot, a second axial portion positioned in another slot (which first and second axial portions may be respectively referred to herein as a "leg" or an "in-slot" conductor or portion), and an end loop portion (which may also be referred to as an "end-turn" or "U-turn" portion) extending between the first axial portion and the second axial portion on the insertion end 32 of the stator 20. The U-turn portions 44 are clearly visible on the insertion end of 32 of the stator in FIG. 3a. Each U-turn portion 44 extends over a number of slots on the insertion end 32 of the stator 20, and this number of slots defines an end loop pitch for the associated coil that is formed the segmented conductor 42. The segmented conductors 42 are not all identical, as some conductors are defined by different end loop pitches, and/or may provided leads or other connections within the winding arrangement 40.

Figure 3B:
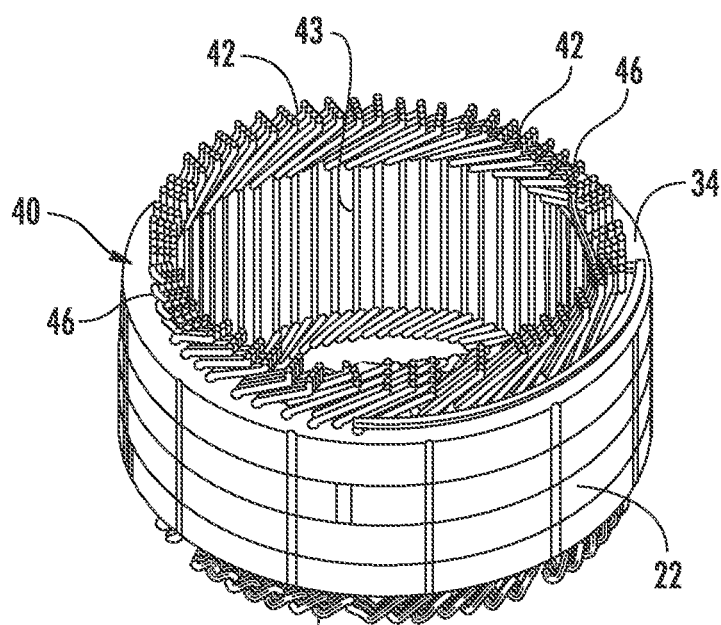
FIG. 3B shows a perspective connection-end view of the stator core of FIG. 3A.

FIG. 3B shows the weld end 34 of the stator 20. As noted previously, the weld end is the opposite side of the stator from the insertion end 32. The leg ends 46 of the segmented conductors are clearly visible on the weld end 34 of the stator. Adjacent leg ends 46 are welded or otherwise joined together to complete electrical paths within the stator. In other words, when the leg ends of multiple segmented conductors are joined together, various windings are formed on the stator core 22. In at least one embodiment, the windings are three phase stator windings with multiple paths for each phase, as explained in further detail below.

Figure 4:
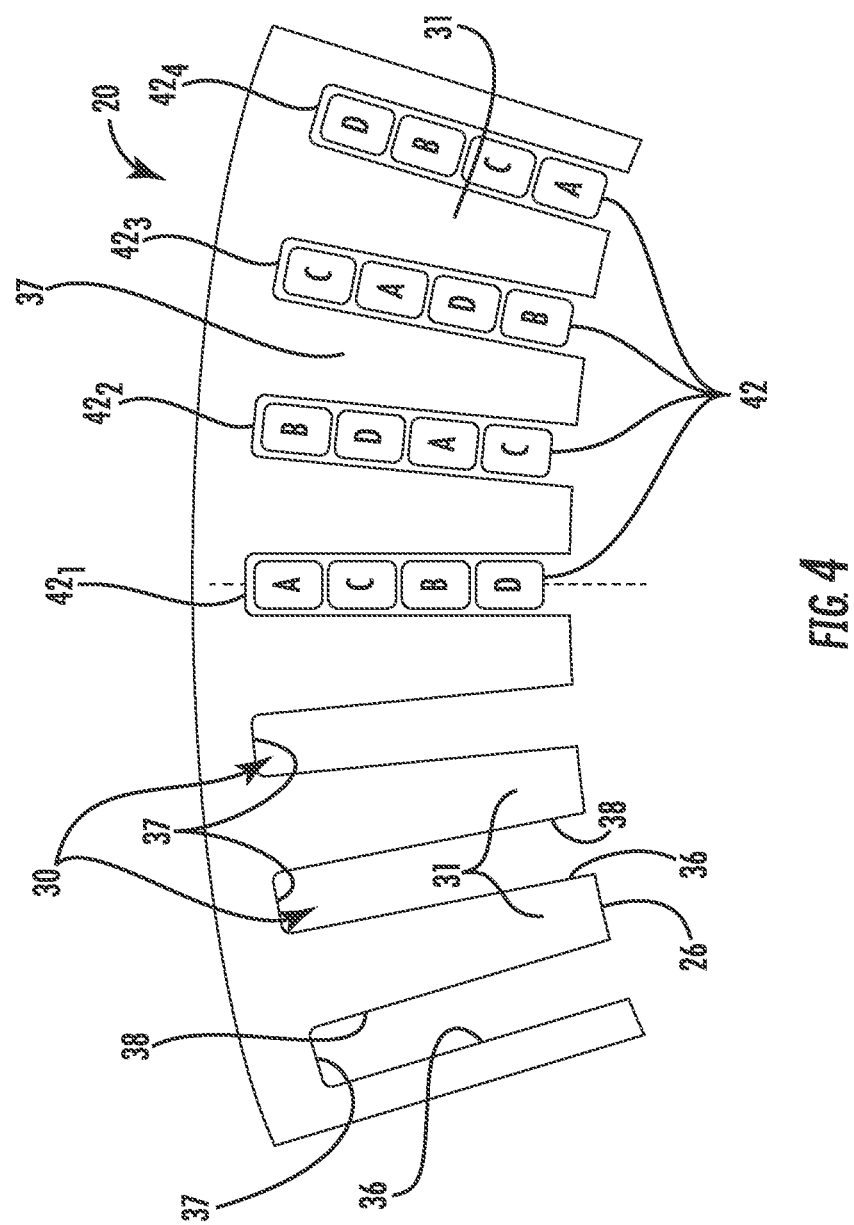
FIG. 4 shows a cross-sectional view of a portion of the stator of FIG. 1 with conductors of four parallel paths of one phase positioned in a four-slot set of the stator core.

FIG. 4 shows an enlarged cross-sectional view of a number of the slots 30 of the stator core 22. For purposes of illustration, some of the slots are empty, and other slots include segmented conductors 42 positioned therein. The slots 30 are formed between the teeth 31. Accordingly, each slot 30 is defined by a first wall portion 36 associated with one tooth, and an opposing second wall portion 38 associated with an adjacent tooth. The first wall portion 36 and the second wall portion 38 of each slot 30 are separated by a back wall portion 37 which establishes a slot width. Both the first wall portion 36 and the second wall portion 38 extend radially inward from the back wall portion 37 to the inner perimeter surface 26 of the stator core 22. The first wall portion 36, second wall portion 38 and back wall portion 37 all extend axially from the insertion end 32 to the weld end 34 of the stator core. Accordingly, each slot provides a passage through the stator core 22 that extends from the insertion end 32 to the weld end 34 of the core. The width of each slot is sufficient in size to receive at least one conductor of the winding arrangement. Additionally, the depth of each slot is configured to receive multiple conductors of the winding arrangement 40. While the slots 30 are shown completely open at the inner perimeter surface 26 in FIG. 4, it will be recognized that in at least some embodiments the slots may be partially closed or completely closed slots. Conversely, in some alternative embodiments, the slots may be reversed and open at the outer perimeter.

The winding arrangement 40 in the embodiment disclosed herein is formed by inserting conductors into each of the slots of the stator core 22. In the embodiment disclosed herein, the conductors 42 are arranged in a single file in each slot, and four conductors are positioned in each slot (i.e., in layers 1-4). Additionally, the slots are divided into sets of slots with four slots in each set. Each four-slot set carries a single phase winding of the complete winding arrangement (e.g., one of phase U, phase V, or phase W). Four parallel paths of conductors fill each four-slot set such that no conductors of other phases are inserted in the slots of a given four-slot set. Thus, as shown in FIG. 4, each of the conductors labeled "A," "B," "C," or "D," represents a conductor associated with one of the four parallel paths for a single phase of the windings (i.e., in the drawings, "A," "B," "C," or "D," represent parallel paths for a single winding phase, and do not represent different phases of the winding arrangement).

As can be appreciated from the illustration of FIG. 4, the position of the parallel paths is different in each slot of a four-slot set. For example, in the leftmost slot (i.e. slot $42_1$, which may also be referred to herein as an "outer-left slot"), layer 1 is "D," layer 2 is "B," layer 3 is "C," and layer 4 is "A" (i.e., D-B-C-A) (although it will be recognized that those of ordinary skill in the art may also number the layers differently such that layer 4 is "D," layer 3 is "B," layer 2 is "C," and layer 1 is "A"). In the inner-left slot (i.e. slot $42_2$, which may also be referred to herein as a "middle-left" or "left-middle" slot) the paths are ordered C-A-D-B. In the inner-right slot (i.e. slot $42_3$, which may also be referred to herein as a "middle-right" or "right-middle" slot) the paths are ordered B-D-A-C. In the rightmost slot (i.e., slot $42_1$, which may also be referred to herein as an "outer-right slot") the paths are ordered A-C-D-B. As will be shown and described in further detail below in association with FIGS. 6A, and 6B, other four-slot sets in the winding arrangement are ordered differently, but no two slots in any four-slot set include the exact same order of conductors.

Figure 5A:
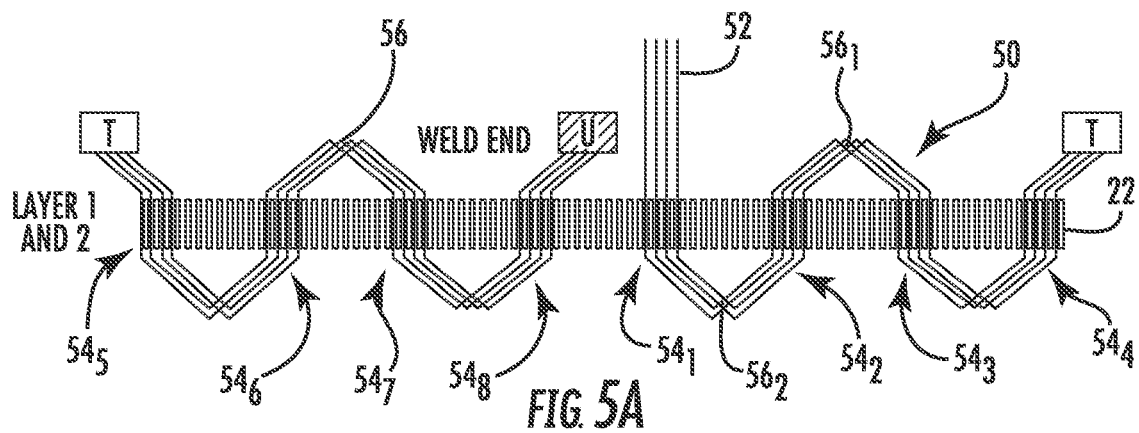
FIG. 5A shows a linear projection view of four parallel paths of one phase of the stator winding arranged in layers 1 and 2 of the slots of the stator core of FIG. 2 for a first revolution around the stator core.
Figure 5B:
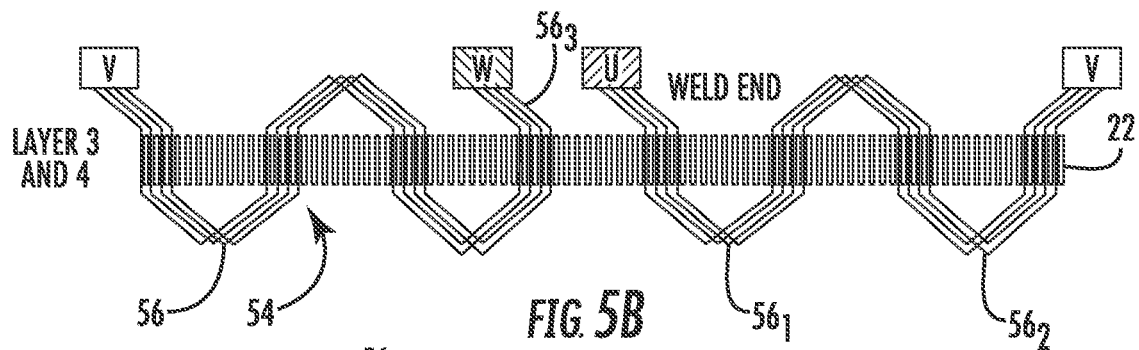
FIG. 5B shows a linear projection view of the four parallel paths of FIG. 5A arranged in layers 3 and 4 of the slots for a second revolution around the stator core.
Figure 5C:
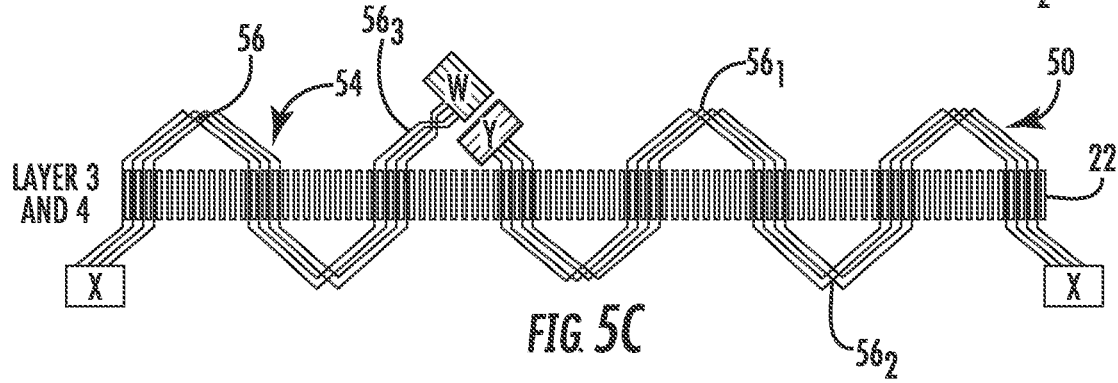
FIG. 5C shows a linear projection view of the four parallel paths of FIG. 5A arranged in layers 3 and 4 of the slots for a third revolution around the stator core.
Figure 5D:
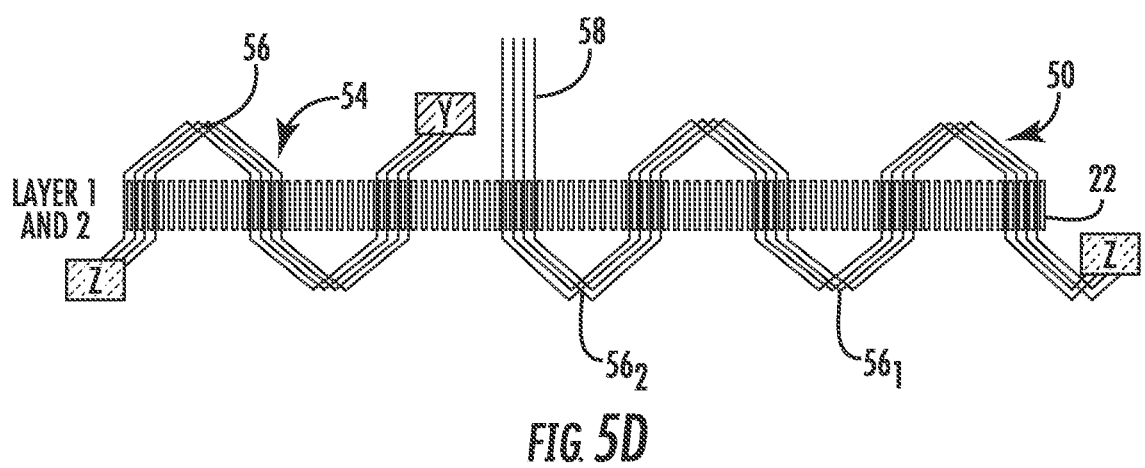
FIG. 5D shows a linear projection view of the four parallel paths of FIG. 5A arranged in layers 1 and 2 of the slots for a fourth revolution around the stator core.

FIGS. 5A-5D show placement of the conductors 42 in the slots for a winding 50 carrying a single phase of the winding arrangement 40 in four parallel paths. In FIGS. 5A-5D, the annular stator core 22 and the associated slots are shown as a linear projection of slots for ease of illustration. FIG. 5A shows a first revolution of the winding conductors 42 around the stator core 22; FIG. 5B shows a second revolution of the winding conductors 42 around the stator core 22; FIG. 5C shows a third revolution of the winding conductors 42 around the stator core 22; and FIG. 5D shows a fourth revolution of the winding conductors 42 around the stator core 22. It will be appreciated that the term "revolution" as used herein in association with the winding conductors refers to a wrap of the conductors substantially around and through the slots of the stator core even if the winding does not completely encircle the stator core a full 360° (e.g., a parallel path that wraps 345° around the stator core is considered to makes a revolution of the stator core even though it may not completely encircle the stator core a full 360° for some reason, such the parallel path ending in leads).

As shown in FIGS. 5A-5D, the conductors 42 in the slots are connected together and form wave-like winding 50 around the stator core 22. It will be appreciated that the noted connections between the left and right ends of the projected stator core 22 (e.g., the T-T connection in FIG. 5A) and the connections between different layers on the stator core (e.g., the U-U connection between layers 1 and 2 in FIG. 5A and layers 3 and 4 in FIG. 5B) are provided for the sake of illustration, as these conductors are actually connected by end-loops on the actual annular winding arrangement for the stator.

As will be noted in each of FIGS. 5A-5D, the four parallel paths of conductors are inserted into eight different four-slot sets $54_1$-$54_8$ as the winding 50 encircles the stator core 22. For each four-slot set 54, a different one of the four parallel paths (A-D) is positioned in a different one of the four contiguous slots of the set. In other words, each layer of a four-slot set includes all four parallel paths. Moreover, as noted previously, only conductors of a single winding phase are provided in each four-slot set. Thus, each slot of a four-slot set includes only one winding phase.

The conductors in adjacent four-slot segments (of one phase) are connected together to form end loops 56. The end loops 56 may be provided by either the conductor U-turns (i.e., the conductor bends positioned on the insertion end 32) or by the leg end welds (i.e., on the welded joints at the weld end 34). As is discussed in further detail below, the coil pitch defined by these end loops 56 (which may also be referred to herein as the "end loop pitch") ranges from ten to fourteen (or in an alternative embodiment, nine to fifteen), depending on which adjacent sets of conductors are connected by the end loops. In FIG. 5A, it will be appreciated that some of the sets of end loops 56 are standard overlapping end loops such that each end loop has the same pitch (e.g., see end loops $56_1$), while other end loops 56 are double-crossed such that the end loops have different pitches with one set of nested end loops overlapping another set of nested end loops (e.g., see end loops $56_2$). When the end loops have different pitches, two of the pitches are short pitches and two of the pitches are long pitches (i.e., the short pitch end loops have a pitch value that is less than the long pitch end loops). The specific pitch values for the various end loop pitches of the winding 50 are discussed in further detail below with reference to FIGS. 6A and 6B.

With continued reference to FIG. 5A, a first revolution of the winding 50 around the stator core 22 is shown. The winding 50 includes a set of leads 52 that enter the stator core 22 from the weld end 34. The winding then encircles the stator core in layers 1 and 2 of the slots. Various end loops 56 connect eight different four-slot sets 54. The first revolution includes six sets of standard end loops $56_1$, and two sets of double-cross end loops $56_2$. At connection U-U (noted at the weld end of the stator core 22 in FIG. 5A near the middle of the stator core projection), the winding transitions to layers 3 and 4 of the slots.

With reference now to FIG. 5B, a second revolution of the winding 50 around the stator core 22 is shown. The winding 50 transitions from layers 1 and 2 to layers 3 and 4 at connection U-U. The winding then encircles the stator core in layers 3 and 4 of the slots. Various end loops 56 connect eight different four-slot sets 54. The first revolution includes five sets of standard end loops $56_1$, and two sets of double-cross end loops $56_2$. At connection W-W (noted at the weld end in FIGS. 5B and 5C near the middle of the stator core projection), the winding switches direction at a set of double-crossed, double-nested end loops $56_3$. Because the progression of the winding switches direction at these end loops $56_3$, the end loops $56_3$ may also be referred to herein as "reverse end loops."

With reference now to FIG. 5C, a third revolution of the winding 50 around the stator core 22 is shown. As noted in the preceding paragraph, the winding 50 switches direction at connection W-W, changing from a left-to-right (i.e., clockwise) progression on the stator core 22 to a right-to-left (i.e., counter-clockwise) progression. The winding then encircles the stator core in layers 3 and 4 of the slots. Various end loops 56 connect eight different four-slot sets 54. The first revolution includes five sets of standard end loops $56_1$, and two sets of double-cross end loops $56_2$. At connection Y-Y, noted at the weld end in FIG. 5C near the middle of the stator core projection, the winding transitions back to layers 1 and 2 of the slots.

With reference now to FIG. 5D, a fourth revolution of the winding 50 around the stator core 22 is shown. The winding 50 transitions from layers 3 and 4 to layers 1 and 2 at connection Y-Y. The winding then encircles the stator core in layers 1 and 2 of the slots. Various end loops 56 connect eight different four-slot sets 54. The fourth revolution includes five sets of standard end loops $56_1$, and two sets of double-cross end loops $56_2$. The winding 50 terminates at a set of leads 58 that exit the stator core 22 from the weld end 34.

With reference now to FIGS. 6A and 6B, two graphs are shown illustrating one phase of the winding of FIG. 5A in further detail with respect to the particular slots of the stator that retain different paths of the winding 50 (i.e., which slots retain which of paths A-D) and the associated layer of the slot where the path is located (i.e., which of layers 1-4 retain said path). FIG. 6A includes a series of arrows to illustrate the winding paths for two clockwise revolutions of the winding 50 around the core 22. FIG. 6B is the same graph as FIG. 6A, but with different arrows to illustrate the winding paths for two counter-clockwise revolutions of the winding 50 around the core 22. The letters "A," "B," "C," and "D," in FIGS. 6A and 6B represent the position of the path within a given slot, and the arrows represent sets of end loops extending between adjacent slot sets for the phase (i.e., adjacent slot sets $54_1$ and $54_2$, $54_2$ and $54_3$, etc.). It will be appreciated that each of slot sets $54_1$, $54_2$, $54_3$, $54_4$, $54_5$, $54_6$, $54_7$, and $54_8$ includes two adjacent slot sets of the phase (i.e., one slot set on either side of a given slot set). Because the stator core is annular, it will be recognized that slot sets $54_6$ and $54_7$ are adjacent slot sets even though they are not shown adjacent to each other in FIGS. 6A and 6B.

As shown in FIG. 6A, the first set of leads 52 allows the winding 50 to enter the first four-slot set $54_1$ (i.e., slots 26-29) of the stator core 22. In this four-slot set, path A is positioned in layer 1 of slot 26, path B is positioned in layer 1 of slot 27, path C is positioned in layer 1 of slot 28, and path D is positioned in layer 1 of slot 29. After entering the first four-slot set at layer 1 of slots 26-29, the winding 50 transitions to layer 2 at a second four-slot set $54_2$ (i.e., slots 38-41) via a series of end loops, as indicated the arrow 60 extending between layers 1 and 2 of slot-set $54_1$ and $54_2$. Then, as shown by the subsequent arrows 61 in FIG. 6A, it can be seen that the winding alternates from one layer to another layer during a first clockwise revolution around the stator core (i.e., back and forth between layers one and two).

For example the B-A-D-C path arrangement is in layer 2 for the slot set $54_2$ (i.e., slots 38-41) but then in layer 1 for slot set $54_3$ (i.e., slots 50-53), and then back in layer 2 for slot set $54_4$ (i.e., slots 62-65), and so forth. By following the position of parallel paths A-D in each of the slot sets, it will also be recognized that the parallel paths A and B remain in the two left slots of each slot set during the first revolution around the stator core, with the positions of paths A and B switching between the leftmost to the middle-left position two times (i.e., between slot sets $54_1$ and $54_2$ as well as $54_5$ and $54_6$). At the same time, the parallel paths C and D remain in the two right slots of each slot set during the first revolution around the stator core, with the positions of paths C and D switching between the rightmost to the middle-right positions two times (i.e., between slot sets $54_1$ and $54_2$ as well as $54_5$ and $54_6$).

With continued reference to FIG. 6A, when the winding 50 arrives at slot set $54_8$, the winding has completed a first revolution of the stator core 22 with all the parallel paths A-D remaining only in layers 1 and 2 for the first revolution. At this point, the end loop transitions the parallel paths A-D of the winding to layer 3 in slot set $54_1$. Then, as shown by the subsequent arrows in FIG. 6A, it can be seen that the winding alternates between layers 3 and 4 during a second clockwise revolution around the stator core until arriving at slot set $54_8$.

A group of special end loops 62 are provided between the conductors in slot set $54_8$ and $54_1$. These end loops 62 include two nested sets of crossed end loops having a special pitch compared to the other end loop pitches of the winding. This arrangement allows the parallel paths that were on the right side of the slot sets to move to the left side, and vice-versa. In particular, as shown in FIG. 6A, the special end loops 62 transition paths A and B from the left-side slots of set $54_8$ to the right-side slots of set $54_1$. At the same time, the special end loops 62 transition paths C and D from the right-side slots of set $54_8$ to the left-side slots of set $54_1$. Then, as noted by arrow 64 in FIG. 6A, the winding changes direction from a clockwise progression to a counter-clockwise progression.

As noted previously, FIG. 6B shows the same slot graph of FIG. 6A, but FIG. 6B illustrates the two counter-clockwise revolutions of the winding 50, while FIG. 6A illustrates the two clockwise revolutions of the winding. FIG. 6B shows the winding switching direction at slot $54_1$ (i.e., switching from the clockwise to the counter-clockwise direction), with the end loops represented by arrow 64 joining the conductors in slot $54_1$ to those in $54_8$. After switching direction, the winding makes a third revolution around the stator core in the counter-clockwise direction. The progression of the arrows in FIG. 6B shows that the winding alternates from one layer to another layer during the third revolution around the stator core (i.e., back and forth between layers 3 and 4). For example the D-C-B-A path arrangement is in layer 3 for the slot set $54_8$ (i.e., slots 14-17) but then in layer 4 for slot set $54_7$ (i.e., slots 2-5), and then back in layer 3 for slot set $54_6$ (i.e., slots 86-89), and so forth. For this third revolution, it will be recognized that the parallel paths A and B remain in the two right slots of each slot set, with the positions of paths A and B switching between the rightmost to the middle-right position two times (i.e., between slot sets $54_1$ and $54_8$ as well as $54_5$ and $54_4$). At the same time, the parallel paths C and D remain in the two left slots of each slot set during the third revolution around the stator core, with the positions of paths C and D switching between the leftmost to the middle-left positions two times (i.e., between slot sets $54_1$ and $54_8$ as well as $54_5$ and $54_4$).

With continued reference to FIG. 6B, when the winding 50 arrives at slot set $54_2$, the winding has completed the third revolution of the stator core 22 with all the parallel paths A-D remaining only in layers 3 and 4 for the third revolution. At this point, the end loop transitions the parallel paths A-D of the winding to layer 2 in slot set $54_1$. Then, as shown by the subsequent arrows in FIG. 6B, the winding alternates between layers 1 and 2 during a fourth revolution (i.e., another counter-clockwise revolution) around the stator core until arriving at slot set $54_2$. A second set of leads 58 are joined to the conductors in the first layer of slot $54_2$, and allow the winding 50 to exit the stator core 22 at this position.

In addition to illustrating the progression of the winding 50 through the slots, FIGS. 6A and 6B also illustrate the differing pitches of the end loops of the winding. The pitch of an end loop may be calculated by the number of slots separating a path in the two adjacent slot sets. For example, in FIG. 6A a thirteen pitch end loop connects the clockwise A-path in layers 1 and 2 of slot sets $54_1$ and $54_2$. This thirteen pitch end loop is calculated by determining that the A-path extends from slot 26 in set $54_1$ to slot 39 in set $54_2$ and then calculating the difference between the slots (i.e., 39−26=13). An eleven pitch end loop connects the B-path in layers 1 and 2 extending from slot set $54_1$ to slot set $54_2$ (i.e., 38−27=11). Other end loop pitches are calculated in the same manner for the end loops extending between adjacent slot sets for a particular phase of the winding.

As shown in the graphs of FIGS. 6A and 6B, all of the end loop pitches are either ten, eleven, twelve, thirteen or fourteen. Most of the end loops in the winding 50 are twelve pitch end loops. The twelve pitch end loops can therefore be known as the most-common pitch or a pitch equal to N. For example, the end loops for each path extending between slot sets $54_2$ and $54_3$ in layers 1 and 2 of FIG. 6A are twelve pitch end loops. In the exemplary winding illustrated by the figures, there is no change of position within the slots for parallel paths connected by twelve pitch end loops. Those end loops having pitches that do not result in a change of position of any parallel paths from slot-to-slot may be referred to herein as "standard" or "common" end loops (i.e., the twelve pitch end loops in the embodiment of the winding disclosed herein).

At two locations for each revolution of the winding 50, the end loop pitches are eleven and thirteen. If the twelve pitch end loops are defined as N, then the eleven pitch end loops would be a defined as N−1 pitch end loops and the thirteen pitch end loops would be defined as N+1 pitch end loops. At these locations, the parallel paths of the winding switch position in the two right slots and the two left slots. In other words, the path in the leftmost slot moves to the middle-left slot, and vice-versa, and the path in the rightmost slot moves to the middle-right slot, and vice-versa. For example, in layers 1 and 2 of FIG. 6A, the end loop for path A extending between slot set $54_1$ and $54_2$ has a pitch of thirteen, and the end loop for path B has a pitch of eleven; this causes the A and B paths cross and switch position in the two left-side slots of these adjacent slot sets. Similarly, the C and D paths also cross and switch position for the two right-side slots of slot sets $54_1$ and $54_2$. Those end loops having pitches that result in a change of position of parallel paths on only one side of the slot sets (i.e., eleven and thirteen pitch end loops in the embodiment of the winding disclosed herein) may be referred to herein as "double crossed" end loops because two position switches result from the end loops, with a first switch on the right side of the slot sets and a second switch on the right side of the slot sets.

At a single location in the winding 50 where the winding progression changes direction, the end loop pitches are ten (N−2) and fourteen (N+2). In FIG. 6A, this location is shown by the end loops 62. These end loops 62 include two nested sets of crossed end loops having a special pitch compared to the other end loop pitches of the winding. The nested end loops include a first set of crossing end loops $62_A$ and $62_B$ having a pitch of fourteen. These end loops $62_A$ and $62_B$ extend over a second set of crossing end loops $62_C$ and $62_D$. This arrangement allows the parallel paths that were on the left side of the slot sets (i.e., paths A and B in FIG. 6A) to move to the right side of the slot sets, and the two parallel paths that were on the right side of the slot sets (i.e., paths C and D in FIG. 6A) to move to the left side of the slot sets. In at least one alternative embodiment (not shown) in order to move paths A and B from the left side of the slot sets to the right side of the slot sets, the end loop of path A has a pitch of fifteen (N+3), an end loop of path B has a pitch of thirteen (N+1), an end loop of path C has a pitch of eleven (N−1), and an end loop of path D has a pitch of nine (N−3). After these end loops, the winding changes direction from a clockwise progression to a counter-clockwise progression, as noted by arrow 64 in FIG. 6A. Those end loops having pitches that result in a change of position of paths from the left side to the right side of the slot sets (e.g., ten and fourteen pitch end loops in the embodiment of the winding disclosed herein) may be referred to herein as "nested double crossed" end loops because there are two pairs of crossing end loops with one pair nested within the other.

Based on the foregoing description of end loop pitches, it will be appreciated that additional features of the winding 50 may be described with respect to the specific pitches of the end loops extending between slot sets. With reference to FIGS. 6A and 6B, the winding 50 begins with leads 52 that connect to the conductors in slot set $54_1$. The end loops extending from slot $54_1$ to slot $54_2$ connect slots 26-29 to slots 38-41 on the weld end of the stator core 22. These end loops are double crossed end loops with the A path and C path end loops having a pitch of thirteen, and the B path and D path end loops having a pitch of eleven. As noted previously, this causes the A-path and B-path conductors to switch positions in the leftmost slot and left-middle slot of the adjacent slot sets, and causes the C-path and D-path conductors to switch positions in the rightmost slot and right-middle slot of the adjacent slot sets.

The next three sets of end loops in the progression are standard end loops each having a pitch of twelve. Therefore conductors B-A-D-C are in the same order from slot sets $54_2$ to $54_5$. In between slots $54_5$ and $54_6$ there is set of double crossed end loops having pitches of thirteen, eleven, thirteen, and eleven, respectively. As a result, the conductors are switched back to their original order A-B-C-D in slot sets $54_6$ through $54_8$. The path conductors then continue in this manner with several standard pitch end loops followed by double crossed end loops until they finish in layer 4 of slot set $54_8$ of FIG. 6A. It will be recognized that for the first two wraps (i.e., revolutions around the stator core 22), parallel paths A and B are always in left slots and left-middle slots, and parallel paths C and D are always in the right slots and right-middle slots.

With continued reference to FIG. 6A, a set of nested double crossed end loops 62 extend between slot sets $54_8$ and $54_1$. In slot set $54_8$ the conductors are in order A-B-C-D. The nested double crossed end loops 62 changes the order of the conductors to C-D-A-B in slot set $54_1$. Thus, the combination of the fourteen and ten pitch end loops essentially flips the conductors for the A-path and B-path from left and left-middle slots to right and right-middle slots for the rest of the winding and vice versa for the C-path and D-path conductors.

With reference now to FIG. 6B, after the A-path and B-path conductors flip sides of the slots in slot set $54_1$, the a set of double crossed end loops having pitches of thirteen, eleven, thirteen, and eleven, respectively, is provided between slots $54_1$ and $54_8$. The next three sets of end loops in the progression are standard end loops each having a pitch of twelve. Therefore conductors D-C-B-A are in the same order from slot sets $54_8$ to $54_5$. In between slots $54_5$ and $54_4$ there is another set of double crossed end loops. As a result, the conductors are switched back to their original order C-D-A-B in slot sets $54_4$ through $54_7$. The conductors then continue in this manner with a set of double crossed end loops followed by several standard pitch end loops and another set double crossed end loops. The conductors then finish in layer 1 of slot set $54_2$ of FIG. 6B where leads 58 are connected to the conductors.

The result of the above-described winding arrangement is a winding with four parallel paths per phase, wherein a first of the four paths (e.g., path A) is housed in the left slot, left-middle slot, right-middle slot and right slot the same number of times over the entire course of the winding. The same is true for each of the other paths (i.e., paths B, C, and D). This results in an electrically balanced winding. In alternative embodiments, the winding is also considered to be electrically balanced, provided that each of the left, middle and right slots, respectively, house each of the parallel paths (e.g., A, B, C and D) the same number of times. This is true even if the number of times the parallel paths are housed in one of the slots (e.g., the left slot) is different from the number of times the parallel paths are housed in the other slots (e.g., the left-middle, right-middle, or right slots). Therefore, as an example, a winding may be considered to be electrically balanced if each of paths A, B, C, and D are each housed in the left slots 16 times, each housed in the left-middle slots 32 times, each housed in the right-middle slots 32 times, and each housed in the right slots 16 times. In other words, the winding is balanced if each of the parallel paths is housed in the left slots the same number of times (W), the middle-left slots the same number of times (X), the middle-right slots the same number of times (Y), and the right slots the same number of times (Z), even if W, X, Y and Z are all different numbers (as a corollary, an example of an unbalanced winding is if path A is housed in the left slots 16 times and parallel path B is housed in the left slots 32 times). Therefore, even though the balanced winding disclosed herein is an arrangement wherein W, X, Y and Z are all the same number, it will be recognized that in other embodiments a balanced winding may be provided even if W, X, Y and Z are different numbers.

While the winding 50 disclosed herein is for a single phase of a three phase winding arrangement, the remaining two phases are be identical, but positioned in different slot sets. Accordingly, the slot sets of the second and third phases are shifted 4 (or a multiple of 4) slots forward and backward, respectively, from the slot sets of the first phase.

In view of the foregoing, it will be recognized that a winding arrangement for a stator is disclosed herein, and in at least one embodiment, the winding has 4 slots per pole per phase and four parallel wires per phase. In at least some embodiments, the winding has 8 poles, 4 wires per slot, and is comprised of segmented conductors. However, it will be recognized that alternative embodiments of the winding arrangement are also possible.

Figure 7B:
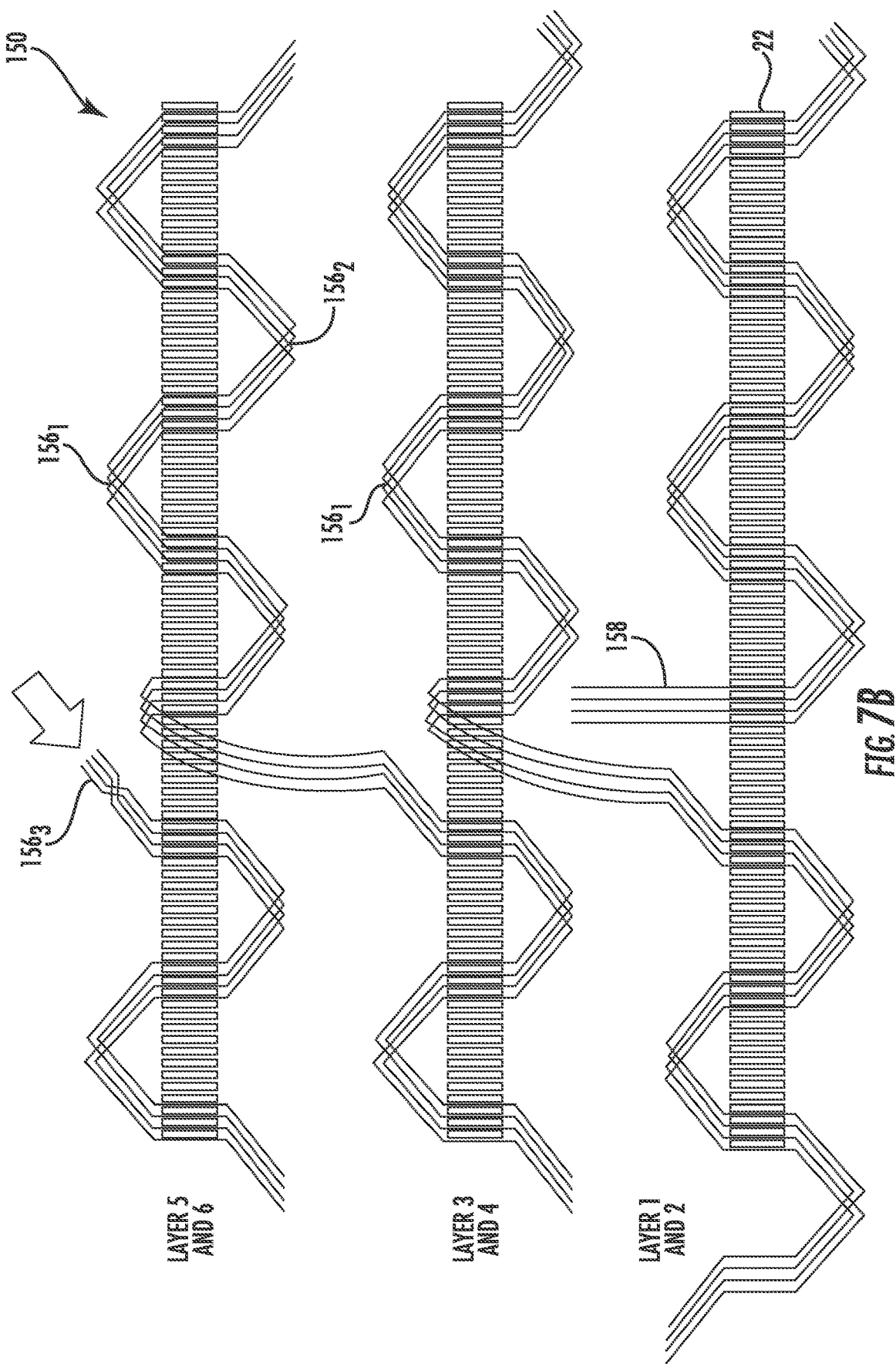
Figure 8:
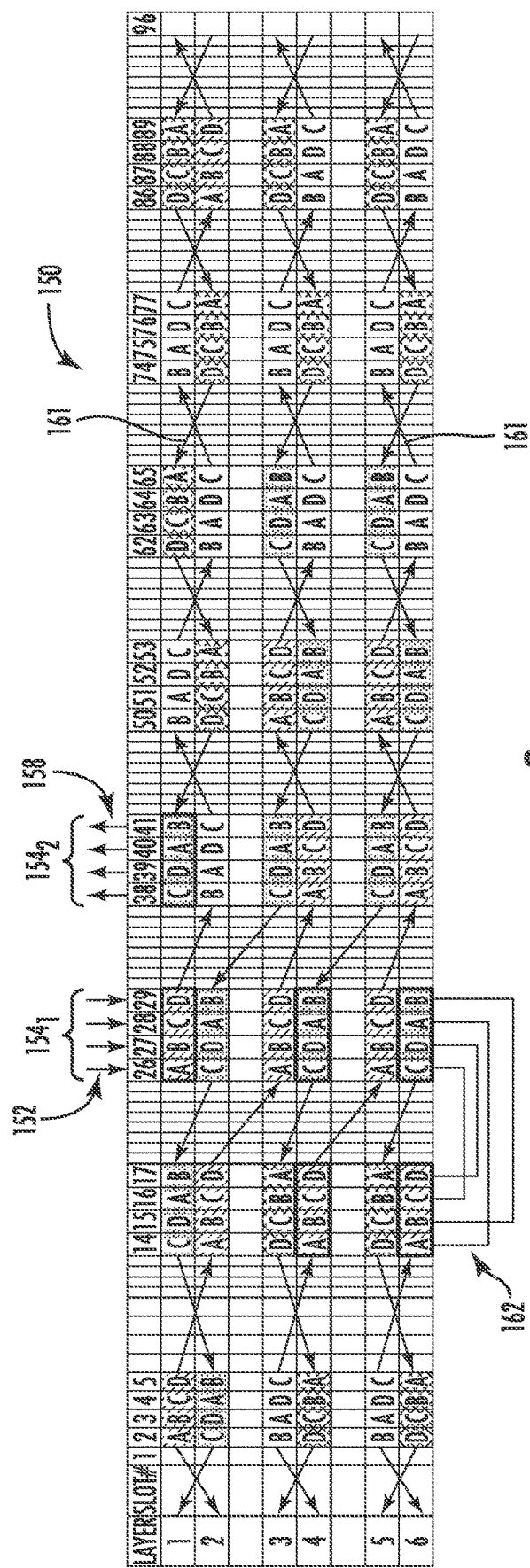
FIG. 8 shows a slot graph including the position of each parallel path A-D and associated end loop connections of the stator winding of FIGS. 7A-7B.

FIGS. 7A, 7B and 8 show one example of an alternative embodiment of a winding 150 wherein six conductors are positioned in each slot (as opposed to four conductors per slot as shown in the embodiment of FIGS. 4-6B). FIGS. 7A and 7B show placement of the conductors of the winding in the slots for a winding 50 carrying a single phase of the winding arrangement 40 in four parallel paths. The winding 150 has four parallel paths which are wound on the core 22 in a wave-like manner in four-slot sets. FIG. 7A shows a first, second and third revolution of the winding conductors around the stator core 22 in a clockwise direction; FIG. 7B shows a fourth, fifth and sixth revolution of the winding conductors around the stator core 22 in a counter-clockwise direction. Similar to the winding 50 shown in FIGS. 5A-5D, the winding 150 includes standard end loops $156_1$, double-cross end loops $156_2$, and a set of double-crossed, double-nested end loops $156_3$. The large arrows in FIGS. 7A and 7B illustrate the connections between the conductors at the double-crossed, double-nested end loops $156_3$, where the winding changes direction from clockwise to counter-clockwise revolutions.

FIG. 8 shows a graph illustrating the winding 150 of FIGS. 7A and 7B in further detail with respect to the particular slots of the stator that retain different paths of the winding 150 (i.e., which slots retain which of paths A-D) and the associated layer of the slot where the path is located (i.e., which of layers 1-6 retain said path). FIG. 8 shows the first leads associated with a first slot set $154_1$, and the second set of leads 158 associated with a second slot set $154_2$. The winding 150 may be considered to enter the core at leads 152, which leads are joined to the encircled conductors of slot set $154_1$. A series of arrows 161 illustrates progression of the winding paths A-D as they make three clockwise revolutions and three counter-clockwise revolutions of the winding 150 around the core 22. The arrows are representative of end turns, including the previously mentioned standard end loops, double-cross end loops, and double-crossed, double-nested end loops.

In addition to illustrating the progression of the winding 150 through the slots, FIG. 8 also illustrates the differing pitches of the end loops of the winding 150. The pitch of an end loop may be calculated by the number of slots separating a path in the two adjacent slot sets. Similar to the winding 50 of FIGS. 5A-6B, in the winding 150 of FIGS. 7A-8, all of the end loop pitches are either ten, eleven, twelve, thirteen or fourteen. The standard end loops have a pitch of 12, the double-cross end loops have pitches of 11 and 13, and the double-crossed, double-nested end loops (shown at location 162 in FIG. 8) have pitches of 10 and 14.

The windings 50, 150 disclosed herein form winding arrangements that result in a lower torque ripple for the electric machine. The windings are advantageously more distributed than other winding arrangements with fewer slots per pole per phase. The winding arrangement disclosed herein may be implemented in an electric machine in any of various configurations and for any of various applications. For example, the windings may be configured using segmented conductors that are inserted into the slots and connected together. Alternatively, the windings may be configured with continuous conductors that are wound on the slots. As an example of applications for the electric machine, the electric machine incorporating the winding arrangement disclosed herein may be used in an electric drive motor, a generator, or a combination alternator/generator.

Figure 9:
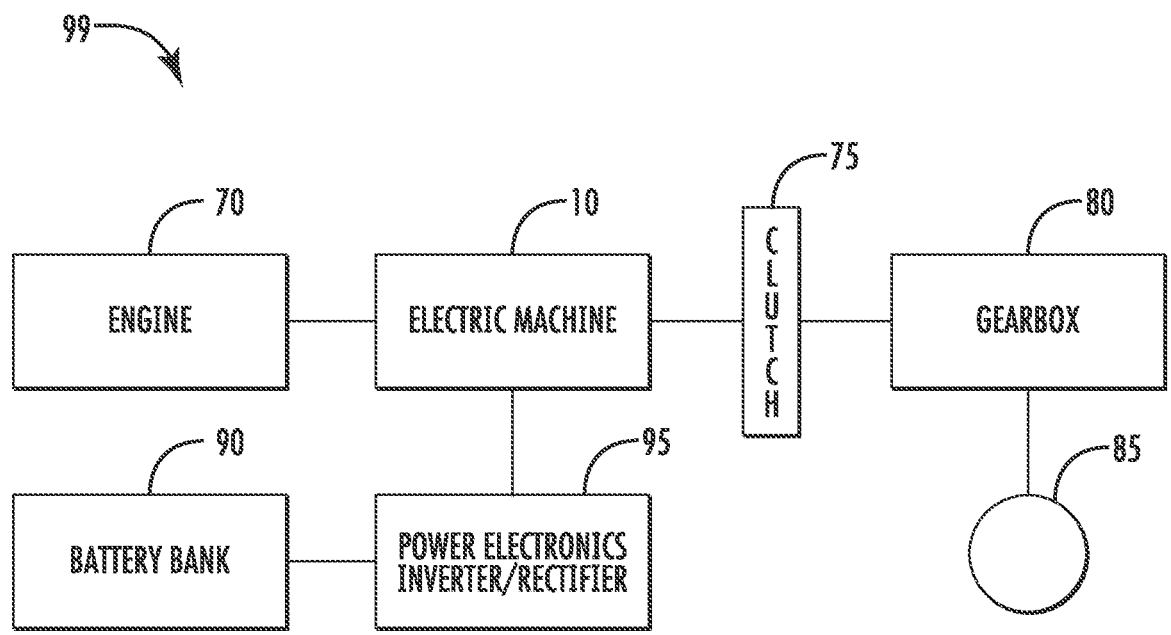
FIG. 9 shows the electric machine of FIG. 1 positioned in a vehicle.

With reference to FIG. 9, in at least one embodiment, the electric machine 10 with a winding having double cross end loops is provided as part of a hybrid electric drive system 99, such as the drive system for a hybrid electric vehicle. The hybrid electric drive system 99 comprises the electric machine 10 which is operably connected to the drive shaft of an internal combustion engine 70. The electric machine 10 is also operably connected to a gearbox 80 through a torque converter or clutch 75. The gearbox is operable to drive the wheels 85 of the hybrid electric vehicle. In addition, the electric machine 10 is operably connected to a battery bank 90 through a power electronics inverter/rectifier 95. The power electronics inverter/rectifier 95 is operable to deliver electric power to the electric machine or absorb electric power from the batteries.

During operation of the hybrid electric vehicle, the electric machine acts as both a motor and a generator. Motoring operations include starter motor operation and vehicle drive operation. First, the electric machine 10 operates as an electric starting motor that cranks internal combustion engine 70. During this time of engine cranking, the clutch 75 disengages the gearbox 80 from the electric machine. During low speed vehicle drive operations, the clutch 75 connects the electric machine 10 and the gearbox 80, allowing the electric machine to act as the propulsion drive, turning the wheels 85 of the vehicle. The electric machine 10 may also act as a propulsion assist for the vehicle during vehicle acceleration. During high speed vehicle driving, the electric machine 10 is driven by the internal combustion engine 70 and operates as an alternator, providing electric power for onboard electric loads and charging the battery bank. Finally, during vehicle braking and deceleration, the electric machine 10 acts as a re-generator which converts kinetic energy from the vehicle to electric power for charging the battery bank 90.

The foregoing detailed description of one or more embodiments of the stator winding connection arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

Various embodiments are presented in the drawings and in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

What is claimed is:

1. A stator for an electric machine comprising:
   a stator core having a plurality of slots formed therein; and
   a stator winding including at least a first phase winding, a second phase winding and a third phase winding positioned in the plurality of slots, the first phase winding including at least four parallel paths, each parallel path including in-slot conductors connected by end loops, each of the end loops defined by an end loop pitch, and each parallel path including at least three different end loop pitches, the at least four parallel paths distributed in slot sets of the stator core, each slot set comprising at least four contiguous slots.

2. The stator of claim 1 wherein a set of double crossed end loops switches a position of a two left parallel paths between a leftmost position and a middle-left position and switches a position of two right parallel paths between a rightmost position and a middle-right position.

3. The stator of claim 2 wherein most of the end loops of each parallel path are defined by an end loop pitch of twelve, wherein at least two of the end loops of each parallel path are defined by an end loop pitch of eleven and thirteen, and wherein one of the end loops of each parallel path is defined by an end loop pitch of ten or fourteen.

4. The stator of claim 1 wherein a direction of winding progression for the plurality of parallel paths reverses at a set of nested double-crossed end loops.

5. The stator of claim 1 wherein the at least three different coil end loop pitches include pitches that range from N−3 to N+3 pitch.

6. The stator of claim 5 wherein N equals 12.

7. The stator of claim 5 wherein the at least three different coil end loop pitches include pitches that range from N−2 to N+2.

8. The stator of claim 7 wherein N equals 12.

9. The stator of claim 5 wherein the at least three different end loop pitches includes at least four different end loop pitches, and wherein the at least four different end loop pitches include an N pitch, an N−1 pitch an N+1 pitch and a fourth pitch.

10. The stator of claim 9 wherein the fourth pitch is an N+2 pitch or an N+3 pitch.

11. A stator for an electric machine comprising:
    a stator core having a plurality of slots formed therein;
    a winding positioned in the plurality of slots, the winding including at least four parallel paths distributed in slot sets of the stator core, each slot set comprising at least four contiguous slots including two left slots and two right slots, each parallel path making at least four revolutions around the stator core, the four revolutions including clockwise first and second revolutions and counter-clockwise third and fourth revolutions, wherein a first parallel path and a second parallel path switch position within the two left slots of the slot sets for the clockwise first and second revolutions, wherein a third parallel path and a fourth parallel path switch position within the two right slots of the slot sets for the clockwise first and second revolutions, wherein the first and second parallel paths switch position in the two right slots of the slot sets for the counter-clockwise third and the fourth revolutions, and wherein the third and fourth parallel paths switch position within the two left slots of the slot sets for the counter-clockwise third and fourth revolutions.

12. The stator of claim 11 wherein each parallel path includes in-slot conductor portions and a plurality of end loops connecting the in-slot conductor portions.

13. The stator of claim 12 wherein a set of double crossed end loops switches the first and second parallel paths in the two left slots between a leftmost position and a middle-left position and switches the third and fourth parallel paths between a rightmost position and a middle-right position.

14. The stator of claim 12 wherein most of the end loops are defined by an end loop pitch of twelve.

15. The stator of claim 14 wherein at least two of the end loops of each parallel path are defined by an end loop pitch of eleven and thirteen, and wherein at least one of the end loops of each parallel path is defined by an end loop pitch of ten or fourteen.

16. The stator of claim 12 wherein a set of nested double-crossed end loops connects the clockwise second revolution and counter-clockwise third revolution of each parallel path.

17. The stator of claim 12 wherein most of the end loops the end loops of each parallel path are defined by end loop pitch of N, and wherein the end loop pitches include pitches that range from N−3 to N+3 pitch.

\* \* \* \* \*